US006839067B2

(12) United States Patent
Liu et al.

(10) Patent No.: US 6,839,067 B2
(45) Date of Patent: Jan. 4, 2005

(54) CAPTURING AND PRODUCING SHARED MULTI-RESOLUTION VIDEO

(75) Inventors: Qiong Liu, Milpitas, CA (US); Don Kimber, Montara, CA (US); Lynn D. Wilcox, Palo Alto, CA (US); Jonathan T. Foote, Menlo Park, CA (US); John Boreczky, San Leandro, CA (US); Patrick Chiu, Menlo Park, CA (US); Shingo Uchihashi, Pittsburgh, PA (US); Hai Tao, Santa Cruz, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 21 days.

(21) Appl. No.: 10/205,739

(22) Filed: Jul. 26, 2002

(65) Prior Publication Data

US 2004/0017386 A1 Jan. 29, 2004

(51) Int. Cl.[7] .................................................. G09G 5/00
(52) U.S. Cl. ..................................................... 345/647
(58) Field of Search ................................ 345/647, 660, 345/667; 348/14.1, 14.12, 143, 159, 211.8, 211.9, 211.11, 211.12, 211.13

(56) References Cited

U.S. PATENT DOCUMENTS

| | | | |
|---|---|---|---|
| 5,757,424 A | 5/1998 | Frederick | 348/218 |
| 6,157,747 A | * 12/2000 | Szeliski et al. | 345/649 |
| 6,452,628 B2 | 9/2002 | Kato et al. | 348/211 |
| 6,624,846 B1 | 9/2003 | Lassiter | 348/211.4 |
| 6,677,979 B1 | * 1/2004 | Westfield | 348/14.12 |

FOREIGN PATENT DOCUMENTS

JP          10-192682        1/2000

OTHER PUBLICATIONS

Michael H. Bianchi, "AutoAuditorium: a Fully Automatic, Multi–Camera System to Televise Auditorium Presentations," Proc. of Joint DARPA/NIST Smart Spaces Technology Workshop, Gathersburg, MD, Jul. 1998, pp. 1–10.

Kimiya Yamaashi, Jeremy R. Cooperstock, Tracy Narine, and William Buxton; "Beating the Limitations of Camera–Monitor Mediated Telepresence with Extra Eyes," Proc. of ACM CHI96, Vancouver, British Columbia, 1996,14 pgs.

Liwei He, Elizabeth Sanocki, Anoop Gupta, and Jonathan Grudin, "Auto–Summarization of Audio–Video Presentations," ACM International Multimedia Conf. (mm 99), Orlando, FL, Oct., 1999, 10 pgs.

Qian Huang, Yuntao Cui, Supun Samarasekera, "Content Based Active Video Data Acquisition Via Automated Cameramen," Proc. IEEE International Conference on Image Processing (ICIP), Chicago, IL, Oct., 1998, 5 pgs.

Qiong Liu, Yong Rui, Anoop Gupta, and JJ Cadiz, Automating Camera Management for Lecture Room Environments, Proceedings of ACM CHI2001, vol. 3, pp. 442–449, Seattle, Washington, U.S.A., Mar. 31–Apr. 5, 2001.

* cited by examiner

Primary Examiner—Matthew Luu
(74) Attorney, Agent, or Firm—Fliesler Meyer LLP (57) ABSTRACT

A method and apparatus for providing multi-resolution video to multiple users under hybrid human and automatic control. Initial environment and close-up images are captured using a first camera and a PTZ camera. The initial images are then stored in memory. Current environment and close-up images are captured and the an estimated difference between the initial and current images and the true image is determined. The estimated differences are weighted and compared and the stored images are updated. A close-up image is then provided to each user of the system. The close-up camera is then directed to a portion of the environment image having high distortion, and current environment and close-up images are captured again.

21 Claims, 7 Drawing Sheets

|   | 1 | 2 | 3 | ... | x |
|---|---|---|---|-----|---|
|   | 510 | 512 | 514 | 516 | 518 |
| 1 | 520 | | | | |
| 2 | 522 | | | | |
| 3 | 524 | | | | |
| ⋮ | 526 | | | | |
| y | 528 | | | | |

CAPTURING AND PRODUCING SHARED MULTI-RESOLUTION VIDEO

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to video image processing, and more particularly to providing multi-resolution video to multiple users under hybrid human and automatic control.

BACKGROUND OF THE INVENTION

Video conferencing from remote locations has become more common. With the development and availability of the Internet and digital cameras, more people are able to interact with others under a variety of circumstances while located at different locations.

Traditionally, a videoconference between two locations has a video camera at each location. Most systems have incorporated pan tilt zoom (PTZ) cameras. In these systems, the PTZ camera can provide a close-up view of an area to a user. In most systems, a viewer from a remote location may control the PTZ camera. However, current PTZ camera video conferencing systems have many disadvantages.

In video conferencing systems having multiple users, remote users may want to control the PTZ camera differently. Past systems have provided a PTZ camera for each remote user in a video conference system. Though this approach provides each user with their own close-up view, providing a separate PTZ camera for each remote user is prohibitively costly. Other systems have provided a single or limited number of PTZ cameras that are locally controlled by a human operator. A local operator may direct the PTZ camera to an area considered important. However, this does not satisfy the needs of remote users who desire different views. Further, the human operator is subject to make human errors and miss important information. Other attempted solutions in video conferencing provide for an automatic control of a PTZ camera. These systems include Bell Core's Auto-Auditorium, Cornell's lecture capturing system, and Microsoft's ICAM system. These systems eliminate the disadvantages of having a human operator control a camera, but don't provide customized video for multiple users.

What is needed is a system for providing video that allows multiple users to choose a personalized camera view, such as that provided by a PTZ camera.

SUMMARY OF THE INVENTION

The present invention provides a hybrid human and automatically controlled multi-resolution video system to multiple users. In one embodiment, the video system provides a overview image stream and a close-up image stream. The overview image window stream displays a series of images, where each of which may be divided into regions. The close-up stream may show a series of close up images of a region or regions of the first video stream. In one embodiment, the user selects a region to display in the close-up window. The source of the image in the close-up window may be a PTZ camera, a memory, or the overview image. A user may request a different source than the source provided by the system. In another embodiment, the system may determine what region to display in the close-up window automatically.

DETAILED DESCRIPTION

The present invention provides a system and method for providing multiple resolution video to multiple users. In one embodiment, the system provides an overview window and a close-up window. The overview window provides a stream of images of a real object or environment. The close-up window provides a stream of images of a close-up view of a particular region of the object or environment provided in the overview window. A user may provide input regarding what region to display in the close-up window. If no user input is received, the system may automatically provide a close-up view.

Figure 1:
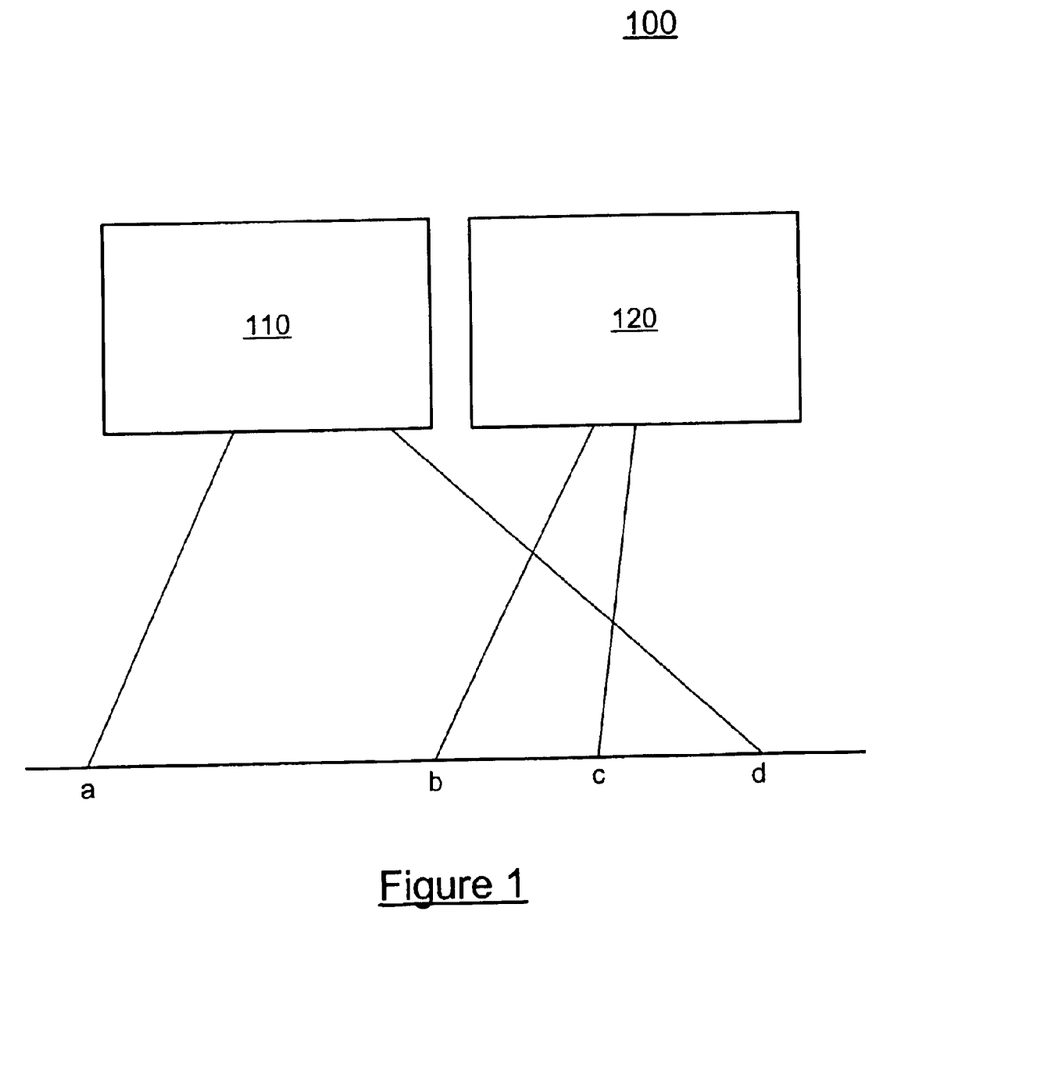
FIG. 1 is an illustration of a video capture system for capturing multi-resolution video in accordance with one embodiment of the present invention.

FIG. 1 illustrates a hybrid camera system 100 in accordance with one embodiment of the present invention. As shown, system 100 includes a first camera 110 and a pan/tilt/zoom (PTZ) camera 120. The first camera may be any camera that captures video frames, such as a panoramic camera, wide-angle camera, or other type of camera. For purposes of discussion, the first camera will be referred to as a panoramic camera. However, any camera type may suffice as the first camera, and the first camera is not intended to be limited to a panoramic camera.

The panoramic camera of FIG. 1 may consist of multiple wide-angle cameras or a single panoramic camera. With multiple wide-angle cameras, captured video is stitched together to generate a panoramic image. In one embodiment, two wide-angle cameras may be used to produce a 1200× 480 resolution image frame with an approximately 100-degree field of view. The PTZ camera can be any camera capable of performing pan, tilt, and zoom operations in response to control signals received by the camera. One such camera is the Sony EVI-D30 PTZ camera. In one embodiment, the PTZ camera can provide 768×492 resolution images and may be zoomed to a 4.4 degree field of view.

In the embodiment shown in FIG. 1, the panoramic camera 110 and PTZ camera 120 are displaced near each other and directed in the same general direction. However, the cameras 110 and 120 may be used in any configuration that allows the PTZ camera to capture any region of the video image provided by the panoramic camera. As shown in FIG. 1, panoramic camera 110 may capture an image corresponding to an area from point A to point D. The PTZ camera may capture an image corresponding to an area from point b to point c, which is within the area captured by the panoramic camera.

In one embodiment, the panoramic camera and PTZ camera are aligned together. As a result, the PTZ camera can be directed to an x,y coordinate taken from the view of the panoramic camera. The alignment can be achieved by physical placement techniques, image recognition techniques, or other methods.

Figure 2:
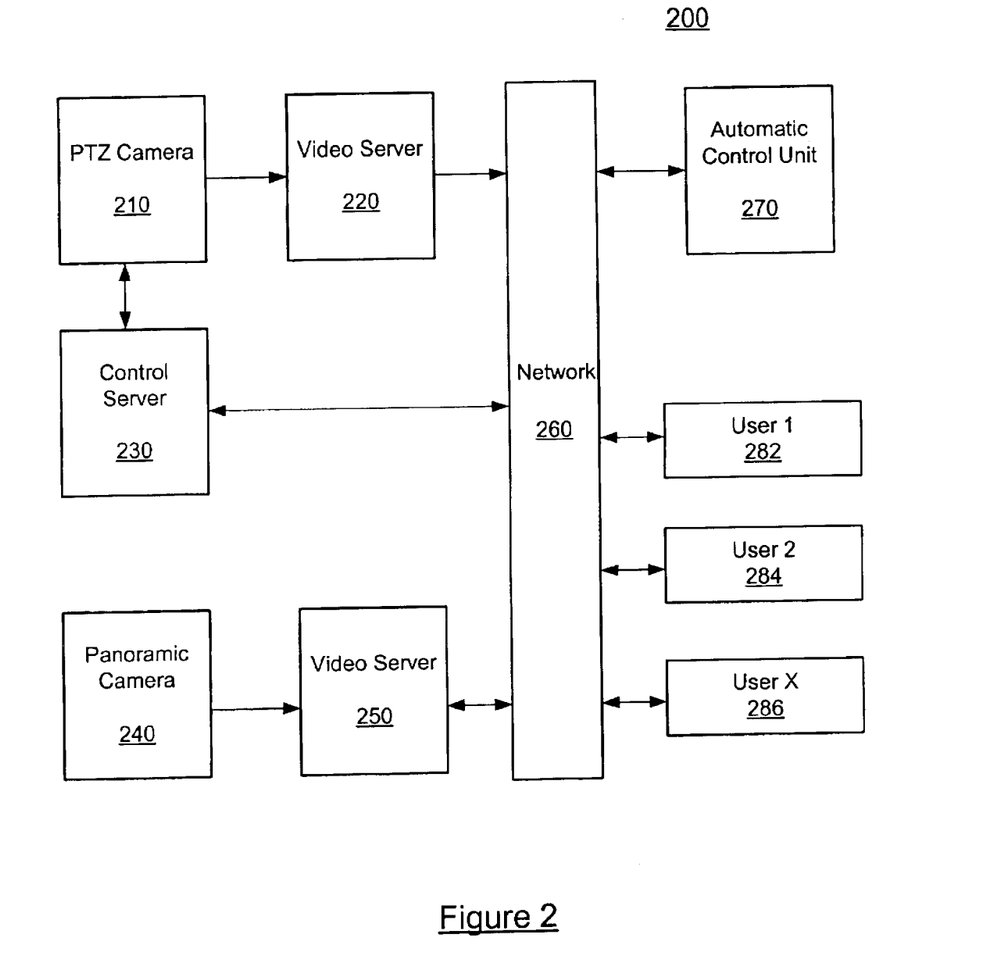
FIG. 2 is an illustration of a system for providing multi-resolution video to multiple users and coordinating input from multiple users in accordance with one embodiment of the present invention.

A system 200 for providing multi-resolution video in accordance with one embodiment of the present invention is illustrated in FIG. 2. System 200 includes PTZ camera 210, video server 220, control server 230, panoramic camera 240, video server 250, network 260, automatic control unit 270, and users 282–286. In one embodiment, the PTZ camera 210 and panoramic camera 240 comprise a hybrid camera system. Video servers 220 and 250 may be separate servers or the same video server. Network 260 may be a wide area network (WAN) or local area network (LAN). The network 260 allows control server 230, video servers 220 and 250, control unit 270 and users 282–286 to transmit and receive information with each other. In one embodiment, the network is a WAN such as the Internet.

In operation, the panoramic camera 240 captures images and transmits image data to video server 250. Video server 250 may transmit the images captured by panoramic camera 240 to the network 260. Control server 230 receives control signals from users 282–286 and automatic control unit 270 over network 260. The control server then processes the received signals and sends control signals to the PTZ camera. In one embodiment, the controller directs the pan, tilt, zoom, and other functions of the PTZ camera to capture images related to regions of the panoramic image. The PTZ camera receives signals from the control server, captures images, and provides image data to video server 220. The video server 220 provides PTZ camera images to users 282–286 and automatic control unit 270. Images captured by the panoramic camera 240 and PTZ camera 210 may also be stored in a memory cache or other memory source (not shown). Users 282–286 and automatic control unit 270 receive video images over network 260 and provide inputs over network 260 to automatic control unit 270 and control server 230.

Figure 3:
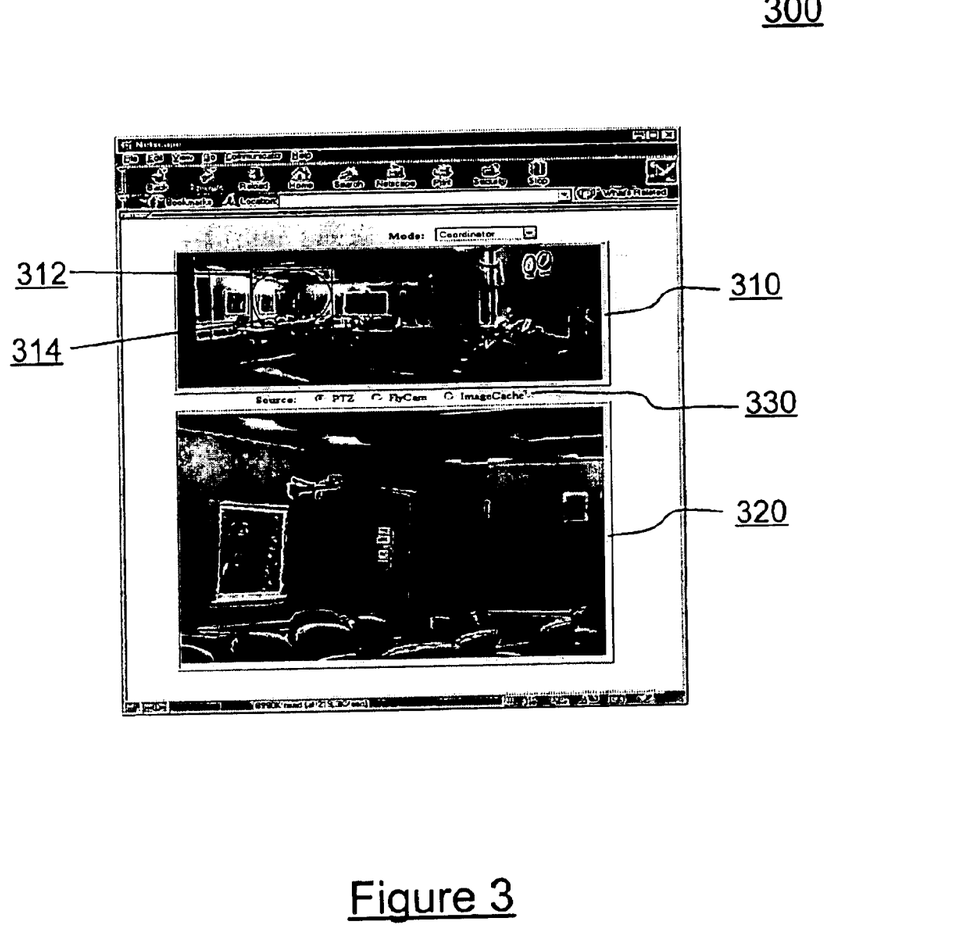
FIG. 3 is an illustration of an interactive interface for presenting multi-resolution video in accordance with one embodiment of the present invention.

System 200 provides multi-resolution video to a user by providing video frame images from a panoramic and PTZ camera. An interface 300 for providing multi-resolution video frame images in accordance with one embodiment of the present invention is shown in FIG. 3. The interface 300 includes a overview window or landscape window 310, a close-up window 320, and close-up source selection device 330. The landscape window provides an image to a user. The image may be of a location or object or be some abstract image. In one embodiment, the landscape window provides an overview video image of an environment. A close-up image is displayed in the close-up window 320. In one embodiment, the close-up image corresponds to a portion of the image displayed in landscape window 310. In the embodiment shown in FIG. 3, the landscape window displays an image of a meeting room. The close-up window displays an image of a portion of the meeting room containing a door and a video camera. Close-up image content may be chosen automatically by the multi-resolution video system or based on input from a user. A box 312 in the landscape window indicates the portion of the landscape window image corresponding to the close-up window image. In one embodiment, the size and location of the box corresponds to input provided by a user. The user may select a region in the landscape window using an input device. In the embodiment shown in FIG. 3, a user has indicated a region in landscape window 310 by marking the region with marker 314. In one embodiment, generating a mark such as marker 314 may be accomplished by placing a cursor over the region and then selecting the region using a mouse device. Other input devices such as a touch screen monitor, keyboard, voice activated input system, and numerical keypad may also be used. At any time, the source of the close-up image may be the PTZ camera, the panoramic camera, or a memory source. In one embodiment, the memory source is a memory cache. The close-up image source may be determined automatically by the multi-resolution video system or by a user. In one embodiment, the user may select the source of the close-up image by providing input that indicates the desired source. In the embodiment shown in FIG. 3, a source selection device 330 allows a user to select a radio button corresponding to the PTZ camera, the panoramic camera, or a cached image. In another embodiment, a user may choose a combination of sources for the close-up image.

Figure 4:
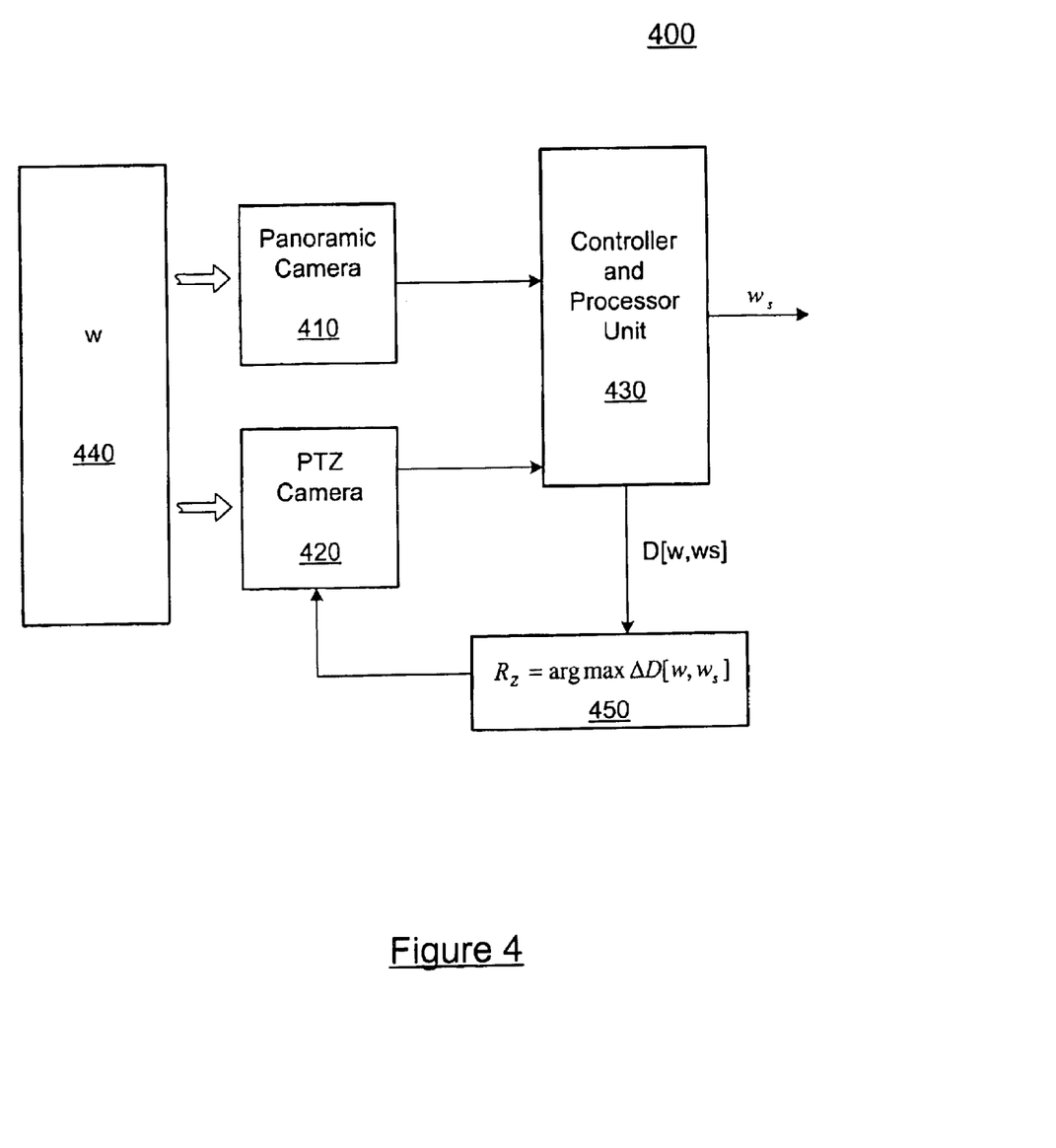
FIG. 4 is an illustration of a control system for providing multi-resolution video in accordance with one embodiment of the present invention.

As discussed above, the system of the present invention may be used to provide multi-resolution video to users automatically. A control system 400 for providing multi-resolution video in accordance with one embodiment of the present invention is shown in FIG. 4. The control system of 400 is a simplified system without incorporating user input. Control system 400 includes a panoramic camera 410, a PTZ camera 420 and controller and processor unit 430. The controller and processor unit may be implemented as circuitry, software, or a combination of both. In operation, the panoramic camera 410 and PTZ camera 420 capture images of real object 440. The real object 440 maybe represented as image function w(x,y,t), where w is the image intensity along a direction x,y at time t. The output P of the panoramic camera is a sampled representation of w(x,y,t) which is band limited in spatial frequency. The PTZ camera 420 captures a portion of real object 440, the portion consisting of a region $R_Z$ in the x,y plane. The output Z of the PTZ camera is a sampling of $R_Z$ at a higher resolution than the panoramic camera. Thus, the PTZ camera output has a higher upper band limit than the panoramic camera output but corresponds to a smaller area $R_Z$. The combined output of P and Z can be written as $w_s(x,y,t)$. The image represented by $w_s(x,y,t)$ will have variable resolution. In particular, the upper band limit will be higher in regions of $w_s(x,y,t)$ provided by the PTZ camera.

The difference or distortion between w(x,y,t) and $w_s(x,y,t)$ can be written as $D[w_s, w]$. The distortion is the detail in w(x,y,t) lost by representing w(x,y,t) with $w_s(x,y,t)$. The distortion may be represented in many ways. In one embodiment of the present invention, the distortion may be represented as the weighted squared error:

$$D[w_s, w] = \int c(x, y, t)[w_s(x, y, t) - w(x, y, t)]^2 \, dx\,dy\,dt \quad (1)$$

where c(x,y,t) is a weighting function that may emphasize particular regions as more important than others. If the squared difference between the real image w(x,y,t) and the captured image $w_s(x,y,t)$ is represented by the error function c, then equation (1) can be written as:

$$D[w_s, w] = \int c(x, y, t) e(x, y, t) \, dx \, dy \, dt \quad (2)$$

Assuming a region R where $w_s(x,y,t)$ is band-limited to spatial frequencies less than $|k|=a$, and $c(x,y,t)$ is constant in the region R, then the contribution to $D[w_s,w]$ from region R at time t is:

$$D(R, a, t) = c \int_R [w_s(x, y, t) - w(x, y, t)]^2 \, dx \, dy \, dt \quad (3)$$

In the spatial frequency domain, equation (3) can be expressed as:

$$D(R, a, t) = c \int [w_s(k_x, k_y, t) - W(k_x, k_y, t)]^2 \, dk_x \, dk_y \quad (4)$$

Assuming that the representation $w_s(x,y,t)$ is a band limited representation of $w(x,y,t)$ sampled with a spatial frequency cutoff of $k_x, k_y < a$, then the distortion can be written as:

$$D(R, a, t) = c \int_{k_x, k_y} W(k_x, k_y, t)^2 \, dk_x \, dk_y \, dt \quad (5)$$

The distortion according to equation (5) may not be precisely known since $w_s(x,y,t)$ differs from $w(x,y,t)$, and $w(x,y,t)$ may not be determined precisely in some cases. One useful quantity is the expected error for region R. The expected error can be written as:

$$E(R, a, t) = E\left[\int_{k_x, k_y > a} W(k_x, k_y, t)^2 \, dk_x \, dk_y \, dt\right] \quad (6)$$

The original sampled image of region R, sampled at time t, maybe assumed to have a cut-off frequency a. If a PTZ camera were to zoom in on region R, the zoomed-in image of region R will have a higher cut-off frequency b. The reduction in distortion between two images of region R having cutoff frequencies of a and b, respectively, may be written as:

$$\Delta D(R,a,t) = c(E(R,a,t) - E(R,b,t)) \quad (7)$$

Figure 5:
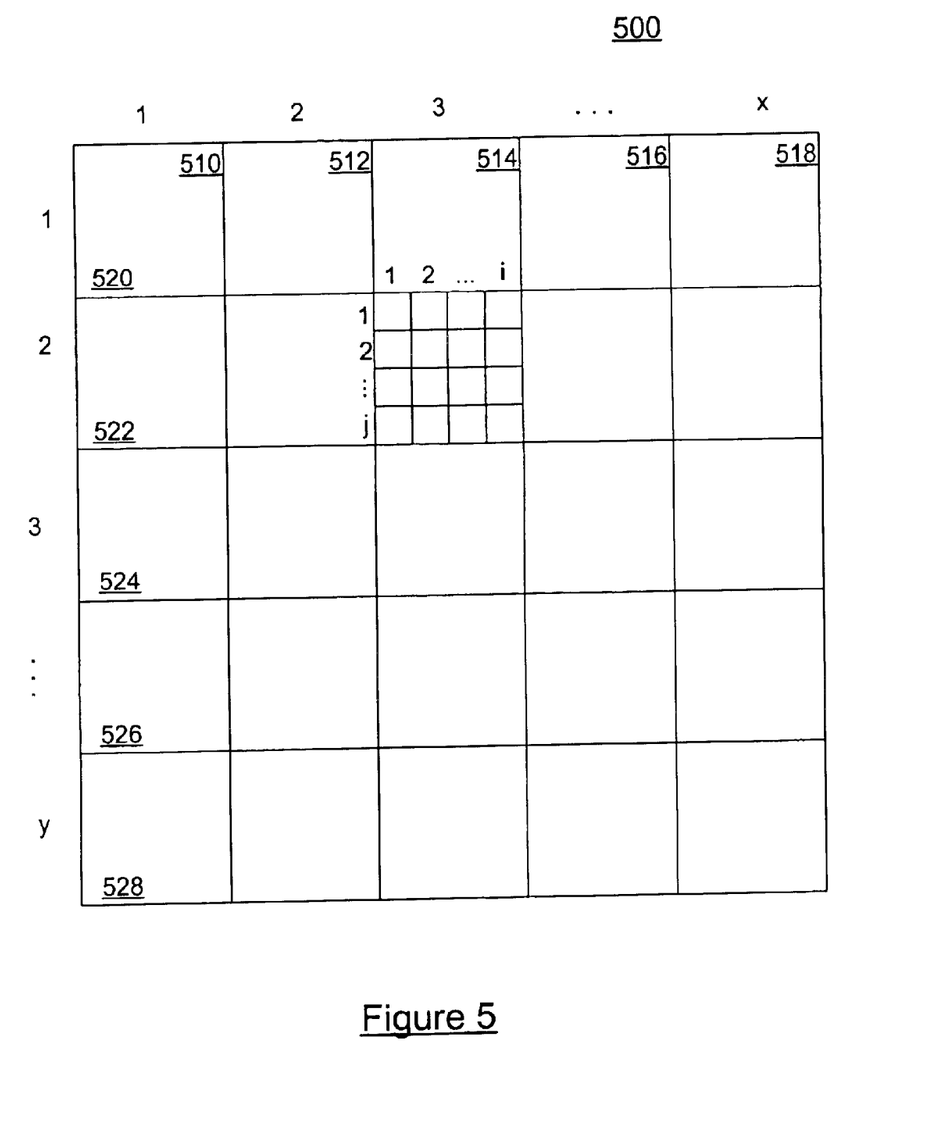
FIG. 5 is an illustration of a video image divided into regions in accordance with one embodiment of the present invention.

As discussed above, an image captured by a camera may be divided up into regions. An illustration of an image 500 divided into regions in accordance with one embodiment of the present invention is shown in FIG. 5. Image 500 is divided into a number of regions. The regions comprise x columns 510–518 and y rows 520–528, wherein each region may be indexed by column and row information x,y. In one embodiment, each region may be further divided up into a number of tiles. For example, the region $R_{3,2}$ at column 3 and row 2 is divided up into tiles that comprise i columns 530–536 and j rows 540–546. In one embodiment, the system 400 of FIG. 4 maintains matrices of quantities related to each tile. The maintained quantities may include the current spatial frequency cut-off $a_{i,j}$ of the tile at i,j, the expected error $E_{i,j}$ for the tile at i,j, and the weight $c_{i,j}$ of the tile at i,j. The contribution from a tile to the overall distortion for a region R may be written as:

$$\Delta D(R, a, t) = \sum_{i,j} c_{ij} \Delta E_{ij} \quad (8)$$

where the sum is taken over all tiles in the region R. In one embodiment, the error estimate $E_{i,j}$ depends on the cut-off frequency $a_{i,j}$ for the tile and the current estimate $w_s(x,y,t)$ around the tile.

Spectral characteristics of $w_s(x,y,t)$ can be used to estimate the error at higher unobserved frequencies. The spectral energy distribution for many natural images is well modeled statistically as falling with frequency as $1/f^2$. The energy in the frequency range between $a_{i,j}$ and $b_{i,j}$ corresponding to the distortion reduction is:

$$\Delta E_{ij} = \int_{a_{ij}}^{b_{ij}} \frac{M_{ij}}{f^2} \, df \quad (9)$$

wherein $M_{ij}$ is the spectral magnitude for the tile at i,j in region R at f=1. The distortion reduction between cut-off frequency a and b can be written as:

$$\Delta E_{ij} = M_{ij} \left( \frac{1}{a_{ij}} - \frac{1}{b_{ij}} \right) \quad (10)$$

In one embodiment, the value $b_{i,j}$ may be determined by the spatial sampling frequency of the PTZ camera image of region R. The quantity $b_{i,j}$ may be expressed as $b_{i,j} = N/\text{width}(T)$, where N is the number of pixels in row j of the tile and the width(T) is the width of the tile. Thus, for a particular region R, an image from a PTZ camera that is zoomed in on region R would have more pixels per region width then a panoramic camera showing an image containing region R.

Returning to the operation of FIG. 4, in the case where no user requests are received or available, the system may automatically reduce the total distortion by properly directing the PTZ camera and capturing images. In this embodiment, the system first compares the panoramic image taken from a time t−1 and the current time t. The comparison is performed by controller and processor unit 430. The controller and processor unit 430 can be implemented using circuitry, software, or a combination of the two. By comparing the two panoramic images, the system may determine which region R in the panoramic images has the highest distortion. The larger the difference between two corresponding panoramic image regions, the larger the distortion will be. The controller and processor unit 430 then directs the PTZ camera at the region $R_Z$ having the most distortion as shown in block 450. The PTZ camera captures an image of the region and sends data to controller and processor unit 430. Unit 430 then stitches the image of the captured region into a cached panoramic image associated with the time at t−1, and associates the updated panoramic image with t. As a result, the image associated with time t−1 is now updated and has a decreased overall distortion. If no motion or difference is detected between the panoramic images, the image distortion discussed above and described in equation 8 is used to guide the PTZ camera for further reduction of the distortion of the cached image or current image. In one embodiment, the captured region $R_Z$ is also stored in a cache or other memory. If at future intervals of time no user requests are received or available, the system will repeat this process.

Figure 6:
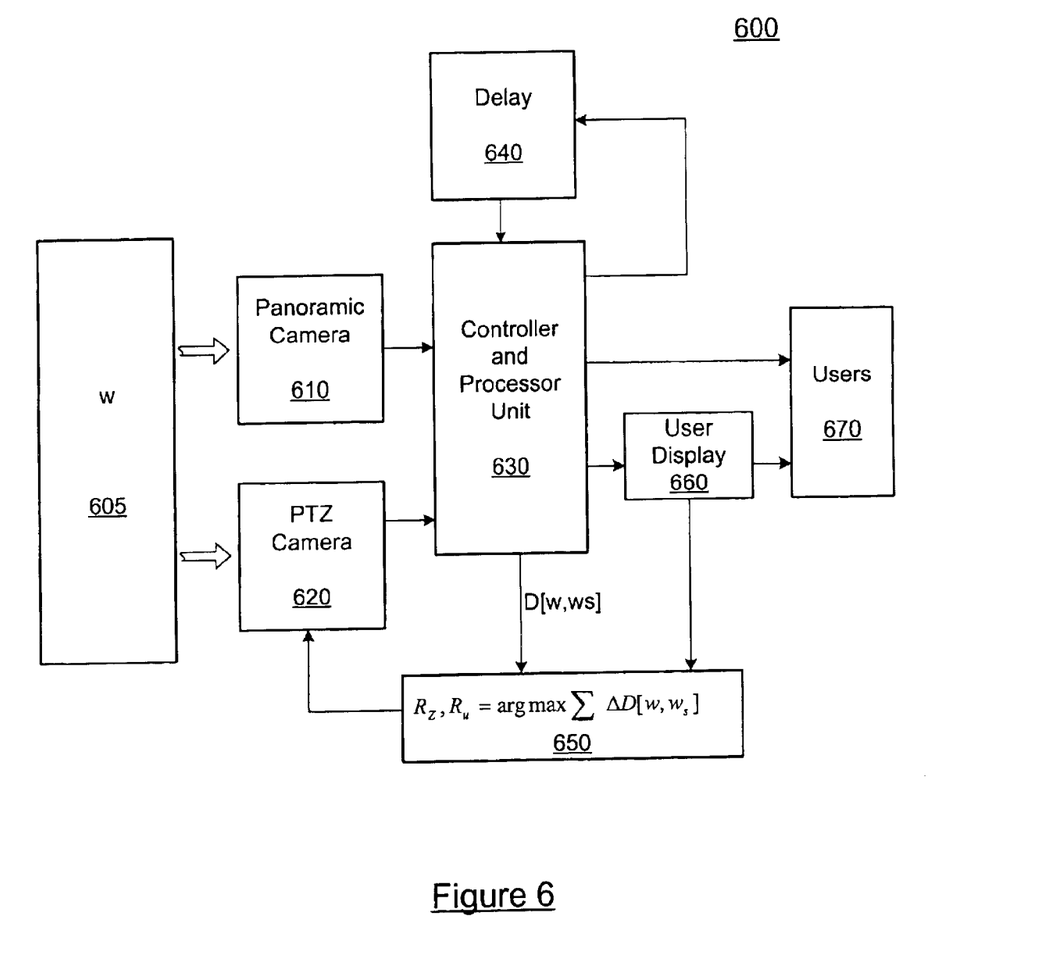
FIG. 6 is an illustration of a control system for providing multi-resolution video to multiple users in accordance with one embodiment of the present invention.

One embodiment of the multi-resolution video system of the present invention may be used by multiple users. A user interface system 600 for providing multiple video streams to multiple users in accordance with one embodiment of the present invention is shown in FIG. 6. As shown, system 600 includes a camera such as a panoramic camera 610, a camera capable of capturing images at a higher resolution such as a PTZ camera 620, controller and processor unit 630, user display 660, and users 670. A user input device may also be present in system 600 (not shown). In one embodiment, the controller and processor unit 630 maybe implemented with circuitry, software, or a combination of both. The user interface 600 provides each user with a panoramic view $P_u$ of a captured image and a close-up view $C_u$ of a region R within $P_u$. In one embodiment, $P_u$ may have limited resolution to reduce processing requirements of the system. For example, a panoramic camera may have a resolution of 1200×480 pixels, but the actual the panoramic display $P_u$ to a user may only have a resolution of 500×200 pixels.

In one embodiment of the present invention, each user u is provided with an image or estimate $w_s(x,y,t)$ of the true image $w(x,y,t)$ and an individual weighting function $c_u(x,y,t)$. The individual weighting function may be determined based on information known about the user such as user classification, a request made by the user, or other information. In one embodiment, the individual weighting function may be expressed as:

$$c_u(x,y,t) = c_o(x,y,t) + s_u(x,y,t) \tag{11}$$

where $c_o(x,y,t)$ relates to a measure of prior weighting and $s_u(x,y,t)$ relates to other weighting information. The prior weighting may be based on prior requests or actions by the user. In one embodiment, if a region R is known to have generated interest in previous video presentations of the same image, this may be incorporated into the weighting of region R at x,y by increasing $c_o(x,y,t)$ for some or all users. In another embodiment, if it is known that the region R containing x,y will contain an image of high or low interest, the prior weighting may be adjusted accordingly to this a priori knowledge. For example, it maybe known that x,y will contain an image of an important slide presentation at a meeting, thus making the region containing the image one of high importance. Other weighting information may incorporate other factors affecting the importance of an image, including user request information. In one embodiment, the value of $s_u(x,y,t)$ may depend on whether or not x,y is within a region selected by the user. In one embodiment, $s_u(x,y,t)$ is set to zero if x,y is not within the region selected by the user u. The loss or distortion of an image provided for a particular user u may be represented as the weighted squared error:

$$D[w_u, w] = \int c_u(x, y, t)[w_u(x, y, t) - w(x, y, t)]^2 \, dx\, dy\, dt \tag{12}$$

Equation 11 can also be written as:

$$D[w_u, w] = \int c_u(x, y, t) e_u(x, y, t) \, dx\, dy\, dt \tag{13}$$

where $e_u(x,y,t) = w_u(x,y,t) - w(x,y,t)$. Equation 12 represents the distortion for one user. In one embodiment, the total distortion of a system providing images to multiple users could be determined as the total distortion of all users of the system:

$$D_{total} = \sum_u D[w_u, w] \tag{14}$$

When providing images for multiple users, system 600 must choose what region $R_Z$ to point the PTZ camera towards and what region or regions to present to a user u as a close-up view $C_u$. In one embodiment, the region $R_Z$ is chosen for minimizing the overall distortion of the system.

Figure 7:
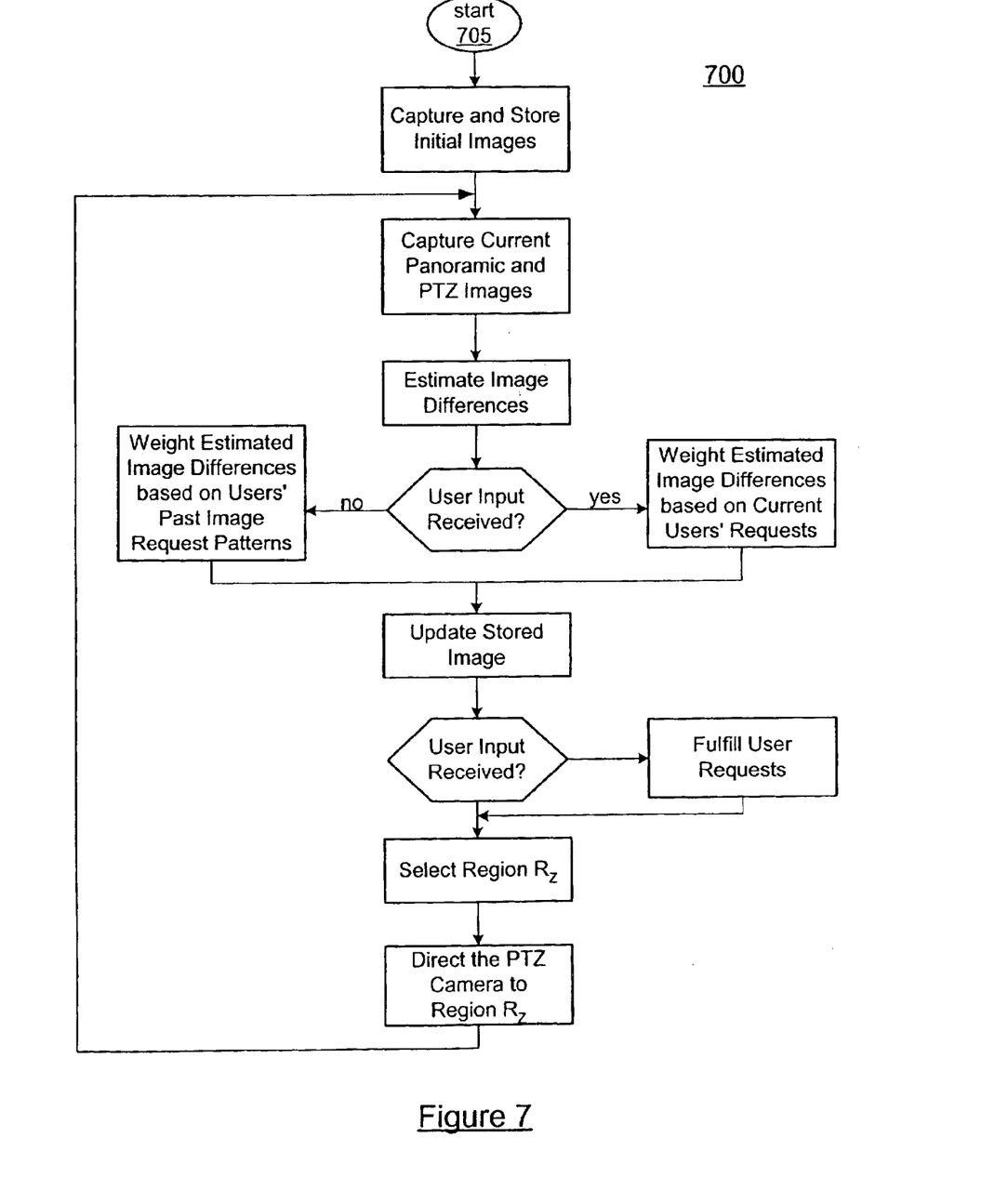
FIG. 7 is an illustration of a method for providing multi-resolution video to multiple users in accordance with one embodiment of the present invention.

Operation of system 600 in accordance with one embodiment of the present invention is illustrated in method 700 of FIG. 7. Operation of method 700 begins at start step 705. Next, an initial set of images are captured and stored in step 710. The set of initial images may include an overview image such as a panoramic image and a close-up image such as a PTZ image. For purposes of example only, the overview image shall be referred to as a panoramic image and the close-up image shall be referred to as a PTZ image for this discussion. In one embodiment, once the images are captured, the images are stitched together. In particular, the PTZ image may be stitched into the panoramic image. The resulting multi-resolution image is then stored in a memory. In one embodiment, the memory is a cache memory.

A current panoramic and PTZ image are captured in step 720. Next, the stored image from step 710 and current panoramic image from step 720 are each compared to a "true" image of the object or environment in step 730 to estimate the differences. In one embodiment, the differences with respect to the true image are estimated. In this embodiment, a is the cut-off frequency of a stored image region and b is the cut-off frequency corresponding to a level of detail obtained by the PTZ camera. The difference reduction achieved by updating the stored image with a current PTZ image can then be estimated according to equation 10. In one embodiment, the difference reductions are determined for each tile in each region of the images.

Next, it is determined whether or not user input is received at step 740. User input may include a request by a user or users to view a close-up of a region in the panoramic image. The user input may by entered by an input device such as a mouse device, a keyboard, a touchscreen, key pad, or any other input device. If a user request is received at step 740, then the image differences estimated in step 730 are weighted according to the user request in step 746. In one embodiment, the more requests a region receives in a specific period of time, the higher the region is weighted. The weighted differences are then considered the distortion measure between the true image and the current and stored panoramic images. The weighted difference measure of distortion in accordance with one embodiment of the present invention is represented in equation 12. If no user input is received in step 740, then the image differences estimated in step 730 are weighted according to past user image request patterns in step 744. In one embodiment, the past image requests of users in the particular system are saved in memory such that they can be retrieved. In one embodiment, when no past image requests of users are available (such as the beginning of system operation) at step 744, the regions are given a uniform weighting. In this case, the weighting will eventually develop from a uniform weighting to a non-uniform weighting over time as users within the system make requests. In another embodiment, when no past user requests are available, the regions are given an initial weighting according to a priori knowledge regarding regions expected to have a high interest. The weighted differences determined in step 744 are considered the distortion measure between the true image and the current and stored panoramic images.

Once the weighted differences are determined, the stored image is updated in step 750. In one embodiment, the system determines the regions, if any, where the current image has less distortion then the stored image. In one embodiment, the distortion measure for a region is determined by adding the distortion for every tile within that region. For each such region, the image of the region in the stored image is replaced with the image of the region in the current image. Thus, current images of a region are stitched into the stored image where it would reduce distortion in the stored image. Next, the system determines whether user input was received in step 760. In one embodiment, the user input received in step 760 may be the same user input received in step 740. If no user input is received, operation continues to step 770. If user input was received in step 760, the system fulfills the user request in step 764. When the user request is a request for a close-up image of a region, the requested region is retrieved from the stored image and transmitted to the requesting user. For multiple user requests, each user request is fulfilled in step 764. After user requests are fulfilled in step 764, operation continues to step 770.

Next, a region $R_Z$ in the stored image is selected in step 770. In one embodiment of the present invention, the selected region $R_Z$ is the region where the distortion for the entire stored image can be most improved with the PTZ camera. The PTZ camera can provide a close-up image of any region in the panoramic image. A close-up of a region using the PTZ camera will provide an image with a high cut-off frequency. Higher cut-off frequency will reduce the distortion to a certain level. Thus, the largest improvement in distortion would correspond to the region in the stored panoramic image having the highest level of distortion. The region having the highest level of distortion is selected as region $R_Z$. The PTZ camera is directed to selected region $R_Z$ in step 780. Then, operation continues to step 720.

The present invention provides a hybrid human and automatically controlled multi-resolution video system to multiple users. In one embodiment, the video system provides a overview window and a close-up window. The overview window displays in image provided by a first video stream. The image from the first video stream may be divided up into regions. The close-up window may display a close-up video image of one or more regions. In one embodiment, the user selects a region to display in the close-up window. Once a user selects a region, the system determines the source of the image in the close-up window. The source of the image in the close-up window may be a PTZ camera, cache memory, or the panoramic camera. A user may request a different source than the source provided by the system. If no user request is available, the system may determine what region to display in the close-up window automatically.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

What is claimed is:

1. A method for providing multi-resolution video to multiple users comprising:

(a) capturing an initial overview image and an initial close-up image, the initial overview image having multiple regions, the initial close-up image having a greater spatial frequency than the initial overview image and depicting less than all of the multiple regions in the initial overview image;

(b) storing the initial images in memory;

(c) capturing a current overview image and current close-up image, the current overview image having regions corresponding to the regions in the initial overview image, the current close-up image depicting less than all of the regions in the current overview image;

(d) determining the distortion between a true image and the initial images and the true image and the current images;

(e) updating the stored images;

(e1) providing the current overview image to at least one user; and (f) providing an individual close-up image to each of the at least one users, wherein said individual close-up image depicting less than all of the multiple regions in the current overview image.

2. The method of claim 1 wherein determining the distortion includes:

(g) estimating the differences between the true image and the initial images and the true image and the current images.

3. The method of claim 2 wherein determining the distortion includes:

(h) weighting the estimated differences based on current user requests.

4. The method of claim 2 wherein determining the distortion includes:

(i) weighting the estimated differences based on past user request patterns.

5. The method of claim 1 wherein storing includes:

(j) stitching the initial close-up image into the initial overview image, thereby creating a multi-resolution overview image; and (k) storing the multi-resolution initial overview image in memory.

6. The method of claim 5, wherein updating includes:

(l) determining any high distortion region in the stored overview image that has more distortion then the corresponding region in the current overview image; and (m) replacing the image in the high distortion region of the stored overview image with the lower distortion image in the corresponding region of the current overview image.

7. The method of claim 5 wherein providing an individual close-up image includes:

(n) determining whether a request is received from each of the at least one users, wherein each request is associated with a region in the current overview image; and (o) for each user from whom a request was received, providing a close-up image of the region associated with the user request.

8. The method of claim 5 wherein providing an individual close-up image includes:

(p) automatically providing a close-up image of a region for a user who did not request a close-up region, the region derived from region request patterns of other users.

9. The method of claim 5 further comprising after step (f):

(q) determining the region in the stored initial overview image having the greatest distortion;

(r) directing a PTZ camera at the region having the greatest distortion; and (s) performing steps (c)–(f) in claim 1, wherein the region captured as the close-up image in step (c) is the region having the greatest distortion in step (q).

10. A computer program product for execution by a server computer for providing multi-resolution video to multiple users, comprising:

(a) computer code for capturing an initial overview image and an initial close-up image, the initial overview image having multiple regions, the initial close-up image having a greater spatial frequency than the initial overview image and depicting less than all of the multiple regions in the initial overview image;

(b) computer code for storing the initial images in memory;

(c) computer code for capturing a current overview image and current close-up image, the current overview image having regions corresponding to the regions in the initial overview image, the current close-up image depicting less than all of the regions in the current overview image;

(d) computer code for determining the distortion between a true image and the initial images and the true image and the current images;

(e) computer code for updating the stored images;

(e1) computer code for providing the current overview image to at least one user; and (f) computer code for providing an individual close-up image to each of the at least one users, wherein said individual close-up image depicting less than all of the multiple regions in the current overview image.

11. The computer program product of claim 10 wherein computer code for determining the distortion includes:

(g) computer code for estimating the differences between the true image and the initial images and the true image and the current images.

12. The computer program product of claim 11 wherein computer code for determining the distortion includes:

(h) computer code for weighting the estimated differences based on current user requests.

13. The computer program product of claim 11 wherein computer code for determining the distortion includes:

(i) computer code for weighting the estimated differences based on past user request patterns.

14. The computer program product of claim 10 wherein computer code for storing includes:

(j) computer code for stitching the initial close-up image into the initial overview image, thereby creating a multi-resolution overview image; and (k) computer code for storing the multi-resolution initial overview image in memory.

15. The computer program product of claim 14, wherein computer code for updating includes:

(l) computer code for determining any high distortion region in the stored overview image that has more distortion then the corresponding region in the current overview image; and (m) computer code for replacing the image in the high distortion region of the stored overview image with the lower distortion image in the corresponding region of the current overview image.

16. The computer program product of claim 14 wherein computer code for providing an individual close-up image includes:

(n) computer code for determining whether a request is received from each of the at least one users, wherein each request is associated with a region in the current overview image; and (o) computer code for each user from whom a request was received, providing a close-up image of the region associated with the user request.

17. The computer program product of claim 14 wherein computer code for providing an individual close-up image includes:

(p) computer code for automatically providing a close-up image of a region for a user who did not request a close-up region, the region derived from region request patterns of other users.

18. The computer program product of claim 14 further comprising after step (f):

(q) computer code for determining the region in the stored initial overview image having the greatest distortion;

(r) computer code for directing a PTZ camera at the region having the greatest distortion; and (s) computer code for performing steps (c)–(f) in claim 1, wherein the region captured as the close-up image in step (c) is the region having the greatest distortion in step (q).

19. An apparatus for providing multi-resolution video to multiple users, comprising:

a processor; and a processor readable storage medium coupled to the processor; said processor readable storage medium containing program code for programming the apparatus to perform a method for providing multi-resolution video to multiple users, the method comprising the steps of:

(a) capturing an initial overview image and an initial close-up image, the initial overview image having multiple regions, the initial close-up image having a greater spatial frequency than the initial overview image and depicting less than all of the multiple regions in the initial overview image;

(b) storing the initial images in memory;

(c) capturing a current overview image and current close-up image, the current overview image having regions corresponding to the regions in the initial overview image, the current close-up image depicting less than all of the regions in the current overview image;

(d) determining the distortion between a true image and the initial images and the true image and the current images;

(e) updating the stored images;

(e1) providing the current overview image to at least one user; and (f) providing an individual close-up image to each of the at least one users, wherein said individual close-up image depicting less than all of the multiple regions in the current overview image.

20. The apparatus of claim 19 wherein storing includes:

(g) stitching the initial close-up image into the initial overview image, thereby creating a multi-resolution overview image; and (h) storing the multi-resolution initial overview image in memory.

21. The apparatus of claim 19, wherein updating includes:

(i) determining any high distortion region in the stored overview image that has more distortion then the corresponding region in the current overview image; and (j) replacing the image in the high distortion region of the stored overview image with the lower distortion image in the corresponding region of the current overview image.

\* \* \* \* \*